United States Patent
He et al.

(10) Patent No.: US 11,797,996 B2
(45) Date of Patent: Oct. 24, 2023

(54) PAYMENT INFORMATION PROCESSING METHOD, APPARATUS, DEVICE AND COMPUTER READABLE STORAGE MEDIUM

(71) Applicant: CHINA UNIONPAY CO., LTD., Shanghai (CN)

(72) Inventors: Shuo He, Shanghai (CN); Cheng Peng, Shanghai (CN); Wei Guo, Shanghai (CN); Wenhai Yu, Shanghai (CN); Limin Zhang, Shanghai (CN); Jin Qian, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/281,489

(22) PCT Filed: Feb. 18, 2020

(86) PCT No.: PCT/CN2020/075697
§ 371 (c)(1),
(2) Date: Mar. 30, 2021

(87) PCT Pub. No.: WO2020/238289
PCT Pub. Date: Dec. 3, 2020

(65) Prior Publication Data
US 2021/0406897 A1 Dec. 30, 2021

(30) Foreign Application Priority Data
May 31, 2019 (CN) .......................... 201910473022.2

(51) Int. Cl.
*G06Q 20/40* (2012.01)
*G06V 20/10* (2022.01)
(Continued)

(52) U.S. Cl.
CPC ....... *G06Q 20/4016* (2013.01); *G06F 18/213* (2023.01); *G06Q 20/3223* (2013.01);
(Continued)

(58) Field of Classification Search
None
See application file for complete search history.

(56) References Cited

U.S. PATENT DOCUMENTS 8,645,274 B2  2/2014  Hasson
10,373,140 B1 * 8/2019  Chang .................... G06Q 30/04
(Continued)

FOREIGN PATENT DOCUMENTS

CN  102687165 A  9/2012
CN  103295341 A  9/2013
(Continued)

OTHER PUBLICATIONS

CN-104574052-A (English translation) Author: Liao (Year: 2015).*
(Continued)

*Primary Examiner* — Arunava Chakravarti
*Assistant Examiner* — Bhavin D Shah
(74) *Attorney, Agent, or Firm* — K&L Gates LLP

(57) ABSTRACT

The present application discloses a payment information processing method, apparatus, device, and computer readable storage medium. The payment information processing method includes: obtaining an environment image collected by a mobile acquiring device, in response to an acquiring request sent by the mobile acquiring device; determining a payment environment confidence level of the mobile acquiring device according to the environment image, under a condition that the mobile acquiring device obtains payment card information; determining a payment information processing result according to the payment environment confidence level.

12 Claims, 9 Drawing Sheets

(51) Int. Cl.
  *G06Q 20/32* (2012.01)
  *G06F 18/213* (2023.01)
  *H04L 9/40* (2022.01)
  *G06Q 20/02* (2012.01)
  *G06Q 20/20* (2012.01)
  *G06Q 20/34* (2012.01)
  *G06Q 40/02* (2023.01)

(52) U.S. Cl.
  CPC ............ *G06V 20/10* (2022.01); *G06Q 20/02* (2013.01); *G06Q 20/208* (2013.01); *G06Q 20/3278* (2013.01); *G06Q 20/341* (2013.01); *G06Q 20/352* (2013.01); *G06Q 20/40145* (2013.01); *G06Q 40/02* (2013.01)

(56) References Cited

U.S. PATENT DOCUMENTS

| | | | |
|---|---|---|---|
| 2002/0099652 A1* | 7/2002 | Herzen | G07G 5/00 705/40 |
| 2010/0008535 A1 | 1/2010 | Abulafia et al. | |
| 2017/0372311 A1* | 12/2017 | Sun | G06Q 20/30 |
| 2018/0096340 A1 | 4/2018 | Omojola et al. | |

FOREIGN PATENT DOCUMENTS

| | | | | |
|---|---|---|---|---|
| CN | 104574052 A | | 4/2015 | |
| CN | 104574052 A | * | 4/2015 | ........... G06Q 20/206 |
| CN | 105765613 A | | 7/2016 | |
| CN | 106056379 A | | 10/2016 | |
| CN | 106973032 A | * | 7/2017 | ........... G06Q 20/325 |
| CN | 106973032 A | | 7/2017 | |
| CN | 107239949 A | | 10/2017 | |
| CN | 107688940 A | | 2/2018 | |
| CN | 107688940 A | * | 2/2018 | ......... G06K 9/00087 |
| CN | 109064178 A | | 12/2018 | |
| CN | 109447080 A | | 3/2019 | |
| CN | 110210854 A | | 9/2019 | |
| KR | 20120049584 A | | 5/2012 | |
| TW | 201828205 A | | 8/2018 | |
| WO | WO2014210576 A2 | | 12/2014 | |
| WO | WO2015183818 A1 | | 12/2015 | |

OTHER PUBLICATIONS

CN-107688940-A (English translation) Author : Shi (Year: 2018).*
CN-106973032-A (English translation) Author : Huang (Year: 2017).*
The Extended European Search Report dated Oct. 29, 2021 issued for European Patent Application No. 20813211.8.
The First Office Action dated Dec. 24, 2020 issued for Chinese Patent Application No. 201910473022.2.
The Second Office Action dated Apr. 28, 2021 issued for Chinese Patent Application No. 201910473022.2.
The International Search Report dated May 19, 2020 issued for PCT Application No. PCT/CN2020/075697.
The First Office Action dated Mar. 16, 2021 issued for Taiwanese Patent Application No. 109105741.
The Rejection Decision dated Jul. 12, 2021 issued for Taiwanese Patent Application No. 109105741.
European Patent Office Action dated Apr. 26, 2022 issued for European Patent Application No. 20813211.8.
Notice of Summons to Attend Oral Proceedings dated Nov. 10, 2022 issued for European Patent Application No. 20813211.8.
The Third Patent Office Action dated Feb. 13, 2023 issued for Taiwanese Patent Application No. 109105741.

* cited by examiner

PAYMENT INFORMATION PROCESSING METHOD, APPARATUS, DEVICE AND COMPUTER READABLE STORAGE MEDIUM

CROSS REFERENCE TO RELATED APPLICATION

The present application is a National Stage of International Application No. PCT/CN2020/075697, filed on Feb. 18, 2020, which claims the priority of Chinese Patent Application No. 201910473022.2 filed on May 31, 2019 and entitled "PAYMENT INFORMATION PROCESSING METHOD, APPARATUS, DEVICE AND COMPUTER READABLE STORAGE MEDIUM". Both of the applications are incorporated herein by reference in their entireties.

TECHNICAL FIELD

The present application relates to the technical field of information processing, in particular to a payment information processing method, apparatus, device and computer readable storage medium.

BACKGROUND

When a merchant uses a mobile acquiring device to acquire payment from a payment card with a contactless chip held by a cardholder to complete a small payment transaction, the mobile acquiring device usually obtains payment card information stored in the contactless ship based on an acquiring request, then directly sends the payment card information to an acquirer and performs the subsequent transaction process.

When the payment card with the contactless chip is used for the small payment transaction, there is generally no need for the cardholder to enter identity authentication information or perform transaction confirmation. Therefore, the payment card may be fraudulently or falsely used, affecting account security of the payment card of the cardholder.

SUMMARY

Embodiments of the present application provide a payment information processing method, apparatus, device, and computer readable storage medium.

In a first aspect, an embodiment of the present application provides a payment information processing method including: obtaining an environment image collected by a mobile acquiring device, in response to an acquiring request sent by the mobile acquiring device; determining a payment environment confidence level of the mobile acquiring device according to the environment image, under a condition that the mobile acquiring device obtains payment card information; determining a payment information processing result according to the payment environment confidence level.

In a second aspect, an embodiment of the present application provides a payment information processing method including: collecting an environment image in response to sending an acquiring request; sending the environment image to a target device, so that under a condition that a mobile acquiring device obtains payment card information, the target device determines a payment environment confidence level of the mobile acquiring device according to the environment image and determines a payment information processing result according to the payment environment confidence level.

In a third aspect, an embodiment of the present application provides a payment information processing apparatus including: an image obtaining unit configured to obtain an environment image collected by a mobile acquiring device, in response to an acquiring request sent by the mobile acquiring device; an environment detection unit configured to determine a payment environment confidence level of the mobile acquiring device according to the environment image, under a condition that the mobile acquiring device obtains payment card information; a detection processing unit configured to determine a payment information processing result according to the payment environment confidence level.

In a fourth aspect, an embodiment of the present application provides a payment information processing apparatus. The apparatus is applied to a mobile acquiring device and includes: an image collection unit configured to collect an environment image in response to sending an acquiring request; an image sending unit configured to send the environment image to a target device, so that under a condition that the mobile acquiring device obtains payment card information, the target device determines a payment environment confidence level of the mobile acquiring device according to the environment image and determines a payment information processing result according to the payment environment confidence level.

In a fifth aspect, an embodiment of the present application provides a payment information processing device including a processor and a memory having computer program instructions stored thereon. The processor, when executing the computer program instructions, implements the payment information processing method according to the first aspect or the second aspect.

In a sixth aspect, an embodiment of the present application provides a computer-readable storage medium having computer program instructions stored thereon. The computer program instructions, when executed by a processor, implement the payment information processing method according to the first aspect or the second aspect.

BRIEF DESCRIPTION OF THE DRAWINGS

The features, advantages, and technical effects of exemplary embodiments of the present application will be described below with reference to the accompanying drawings.

DETAILED DESCRIPTION

Implementations of the present application will be described in further detail below in conjunction with the accompanying drawings and embodiments. The detailed description and drawings of the following embodiments are used to exemplarily illustrate the principle of the application, but cannot be used to limit the scope of the application, that is, the application is not limited to the described embodiments.

Figure 1:
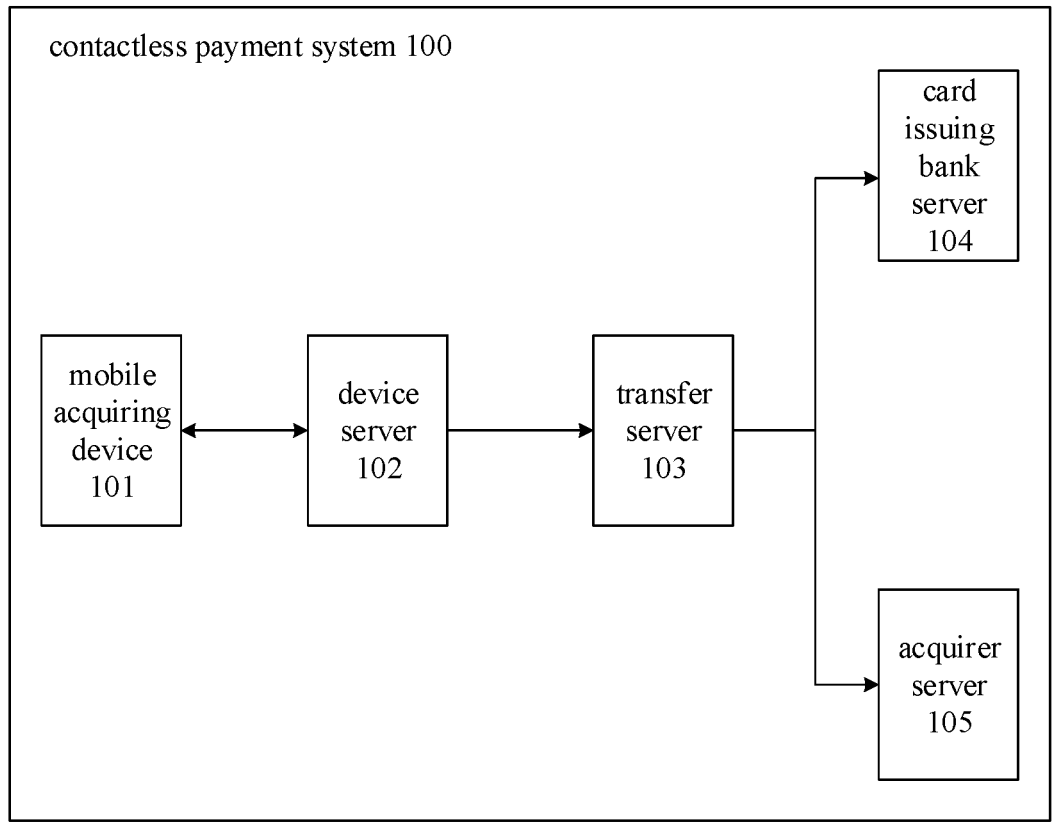
FIG. 1 is a system architecture diagram of a contactless payment system according to an example of the present application.

FIG. 1 shows a system architecture diagram of a contactless payment system according to an example of the present application. The contactless payment system 100 includes a mobile acquiring device 101, a device server 102, a transfer server 103, a card issuing bank server 104, and an acquirer server 105.

The mobile acquiring device 101 may be a Point of sales (POS) device or a mobile terminal with a POS function.

The mobile acquiring device 101 includes a POS function module and an identity verification module. The POS function module supports at least a flash payment function via a payment card and a flash payment function via a third-party payment software. The POS function module is used by a merchant to send an acquiring request, and in response to the acquiring request being sent, obtains information about the payment card with a contactless chip held by a cardholder or payment information of the third-party payment software in the mobile terminal used by a payer. The identity verification module supports at least one of password verification, face verification, and fingerprint verification, and is used to obtain verification information entered by the merchant. The device server 102 includes a business function server and an identity verification server. The business function server is used for processing of a payment card transaction or a third-party payment software transaction. The identity verification server is used for processing of the identity verification of the merchant. The device server 102 communicates with the card issuing bank server 104 and the acquirer server 105 through the transfer server 103 to transmit transaction information. After completion of the transaction, the card issuing bank server 104 may send payment related information to the cardholder's mobile terminal, and the acquirer server 105 may send payment collection related information to the mobile acquiring device 101.

In order to solve the problem in the prior art that the payment card with the contactless chip or the third-party payment software in the mobile terminal may be fraudulently or falsely used on the mobile acquiring device 101, the mobile acquiring device 101 in the embodiment of the present application may be additionally provided with a risk assessment module for collecting relevant data used to assess transaction risk, and the device server 102 may be additionally provided with a risk prevention and control server for determining a payment information processing result related to the transaction risk based on the relevant data.

A payment information processing method provided by the embodiment of the present application will be firstly introduced below. The payment information processing method may be applied to the device server 102 shown in FIG. 1.

Figure 2:
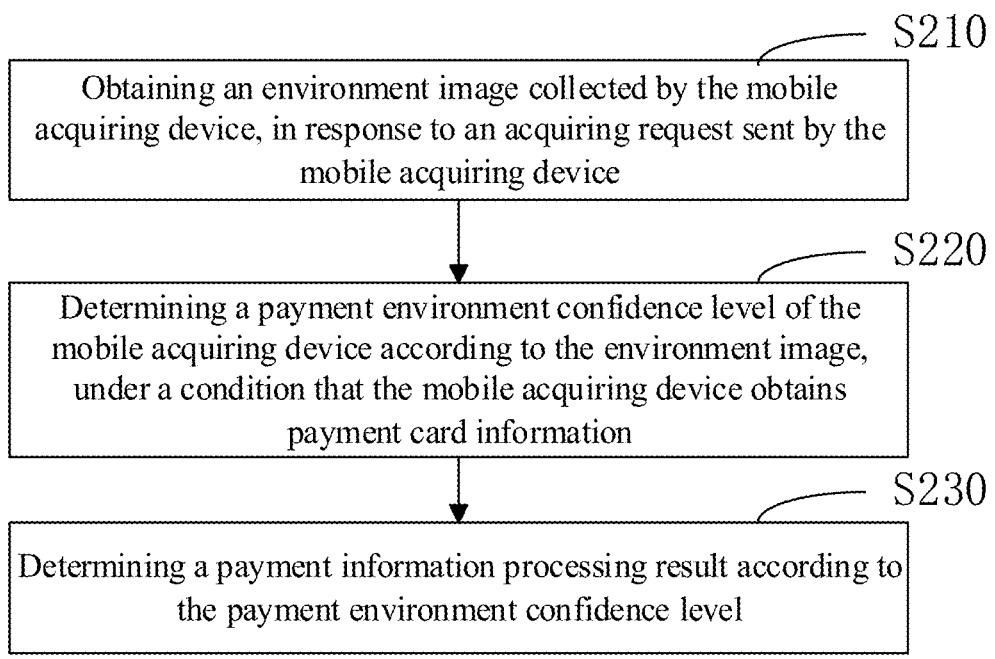
FIG. 2 is a schematic flowchart of a payment information processing method provided by an embodiment of the present application.

FIG. 2 shows a schematic flowchart of a payment information processing method provided by an embodiment of the present application. As shown in FIG. 2, the payment information processing method includes:

S210: obtaining an environment image collected by the mobile acquiring device, in response to an acquiring request sent by the mobile acquiring device;

S220: determining a payment environment confidence level of the mobile acquiring device according to the environment image, under a condition that the mobile acquiring device obtains payment card information;

S230: determining a payment information processing result according to the payment environment confidence level.

In the embodiment of the present application, after the mobile acquiring device sends the acquiring request, the environment image collected by the mobile acquiring device can be obtained, and under a condition that the mobile acquiring device obtains the payment card information of the payment card, the payment environment confidence level of the mobile acquiring device may be determined by use of the environment image, so that the payment information processing result related to the transaction risk can be determined based on the payment environment confidence level so as to provide a risk judgment basis for the transaction. Thus when the merchant uses the mobile acquiring device to initiate a transaction and obtain a transaction object, security of a payment card account of a cardholder corresponding to the transaction object can be improved, and a probability of false or fraudulent use of the payment card can be reduced.

The payment information processing method of the embodiment of the present application may be applied to various transaction cards with a contactless chip or a contact chip, such as a bank card, a bus card or a shopping card, etc.; and may also be applied to a third party payment software in a mobile terminal.

In step S210 of the embodiment of the present application, when the merchant uses the mobile acquiring device to have a transaction with the cardholder, the merchant may firstly need to use the mobile acquiring device to send the acquiring request; after sending the acquiring request, the mobile acquiring device may send the acquiring request and/or an acquiring request signal to the device server; and the device server may respond to the acquiring request sent by the mobile acquiring device by responding to the acquiring request and/or the acquiring request signal, and obtain the environment image collected by the mobile acquiring device.

In some embodiments of the present application, the obtained environment image may be the environment image collected by the mobile acquiring device before a moment when the payment card information is obtained. In this way, the payment card information being actually obtained (i.e. the payment card being actually swiped) can be taken as an ending sign, so as to prevent the merchant who fraudulently uses the payment card from performing an "action demonstration" before the payment card is actually swiped to circumvent transaction detection based on environment image detection.

In some other embodiments of the present application, the obtained environment image may be an image collected by the mobile acquiring device between a first moment and a second moment, where the first moment is a moment when the mobile acquiring device sends the acquiring request and the second moment is a moment when the mobile acquiring device obtains the payment card information. In these embodiments, it is not only possible to prevent circumvention of the transaction detection based on the environment image detection, but also possible to reduce an amount of image processing, improve efficiency of the image processing and reduce resource occupation of the device server since the image is collected only from the moment when the acquiring request is sent to the moment when the payment card information is obtained, i.e. during a period when the payment card is actually swiped.

In other embodiments of the present application, the obtained environment image may also be an image collected by the mobile acquiring device between the first moment and a third moment, where the third moment is a moment when the second moment is delayed to reach a delay period.

In step S210 of the embodiment of the present application, a specific moment of obtaining the environment image collected by the mobile acquiring device in response to the acquiring request sent by the mobile acquiring device may be a moment of receiving the acquiring request sent by the mobile acquiring device, that is, after receiving the acquiring request sent by the mobile acquiring device, environment images collected by the mobile acquiring device may be continuously obtained; the specific moment of obtaining the environment image collected by the mobile acquiring device may also be a moment when the mobile acquiring device obtains the payment card information, that is, after the mobile acquiring device obtains the payment card information, all the environment images collected by the mobile acquiring device before obtaining the payment card information may be received.

In step S220 of some embodiments of the present application, the payment card information may be information stored in the contact chip or the contactless chip of the payment card. In step S220 in some other embodiments of the present application, the payment card information may also be information stored in the mobile terminal.

The payment card information may include at least identity information of the cardholder of the payment card and account information of the payment card. The payment card information may be used by a card issuing bank to verify the identity of the cardholder and the transaction account for the transaction.

After the mobile acquiring device initiates the acquiring request, the information in the chip of the payment card may be distinguished from the information in the mobile terminal based on data fields of the information read by the mobile acquiring device using Near Field Communication (NFC) technology.

In the embodiment of the present application, the waiting time for the mobile acquiring device to obtain the payment card information in response to sending the acquiring request may also be limited, so that under a condition that the response to the acquiring request reaches a predetermined time period and the mobile acquiring device has not obtained the payment card information, the device server can reobtain the environment image collected by the mobile acquiring device in response to an acquiring request resent by the mobile acquiring device. That is, under a condition that the waiting time for the mobile acquiring device to obtain the payment card information reaches the predetermined time period and the mobile acquiring device has not yet obtained the payment card information, the transaction may be terminated, and thus the mobile acquiring device may need to resend the acquiring request. In this case, the device server may reobtain the environment image collected by the mobile acquiring device in response to the acquiring request resent by the mobile acquiring device.

In the embodiment of the present application, the predetermined time period may be set to be any time period in a range of 5 s to 8 s, such as 5 s, 6 s, or 8 s, and may also be set to be other time periods as required.

Since the predetermined time period corresponding to the waiting time for the mobile acquiring device to obtain the payment card information is set in the embodiment of the present application, a possibility that a merchant fraudulently using the payment card continuously uses the mobile acquiring device to fraudulently use the payment card can be reduced in the embodiment of the present application.

In the embodiment of the present application, depending on the environment image, the determined payment environment confidence level may include at least one of a payment card confidence level, a finger confidence level, and a confidence level of the acquiring device being wrapped by an outer object.

When the payment environment confidence level includes the payment card confidence level, the specific method for determining the payment card confidence level of the mobile acquiring device according to the environment image may include: extracting feature maps of the environment image to obtain the feature maps of multiple scales; and identifying the payment card confidence level of existence of the payment card in the environment image, based on the feature maps of multiple scales.

Specifically, a payment card detection model may be obtained based on deep learning, and the payment card detection model may be used to detect the payment card confidence level. The payment card detection model may include a feature map extraction unit and a payment card detection unit. The feature map extraction unit may be used to obtain the corresponding feature maps of multiple scales according to the input environment image. The payment card detection unit may be used to obtain candidate regions according to the feature maps of multiple scales, perform fine-tuning and de-duplication on the candidate regions, and finally obtain the position of the payment card and the payment card confidence level. The candidate regions may be fine-tuned using a regression vector of bounding boxes of the candidate regions, and an overlapping candidate region may be removed by use of the Non-Maximum Suppression (NMS) algorithm, so as to obtain an accurately located position of the payment card and the payment card confidence level.

The feature map extraction unit of the payment card detection model used in the embodiment of the present application can quickly reduce sizes of the feature maps through relatively sparse sliding convolution and obtain the feature maps of multiple scales to ensure diversity of a perception field of view.

The payment card detection unit of the payment card detection model used in the embodiment of the present application refers to a multi-scale detection idea in the Single Shot Multi Box Detector (SSD) method to output, for the feature map of each scale, a detection result of that scale. The overall process is from coarse to fine. Firstly, a large number of candidate windows may be detected to ensure a recall rate, and then the detection result about the position of the payment card and the payment card confidence level may be obtained by fine-tuning and de-duplicating the candidate regions.

Therefore, the payment card detection model used in the embodiment of the present application has a simple structure, high efficiency, and high accuracy, and is suitable for use in scenarios with low power consumption and low latency.

In the embodiment of the present application, the image sample set used for training the payment card detection model can be obtained by use of big data, so that the size of samples in the image sample set is large and the sources of the samples are various. The image sample set may include different types of payment card images, payment card images with different backgrounds, payment card images with different imaging angles, payment card images with different lighting conditions, etc., so that the samples in the image sample set are diverse. The image sample set may also include "typical samples" that may appear during actual use, that is, "boundary samples", so that the samples in the image sample set are typical. The magnitudes of samples of different categories in the image sample set should be relatively close to avoid the difference in learning emphases of the payment card detection model caused by uneven sample numbers, which will affect generalization performance of the payment card detection model in actual use. The image sample set obtained based on the above method can avoid an over-fitting phenomenon caused by too few or too flat samples in the image sample set, and can make the payment card detection model obtained by training more robust in actual use and have a strong generalization ability.

In order to further improve the diversity and quantity of the image sample set, enrich the image sample set used in training, better extract image features, and generalize the payment card detection model, enhancement methods such as spatial geometric transformation, pixel color transformation and the like may be applied to process the existing samples to expand the number of samples in the image sample set.

Figure 3:
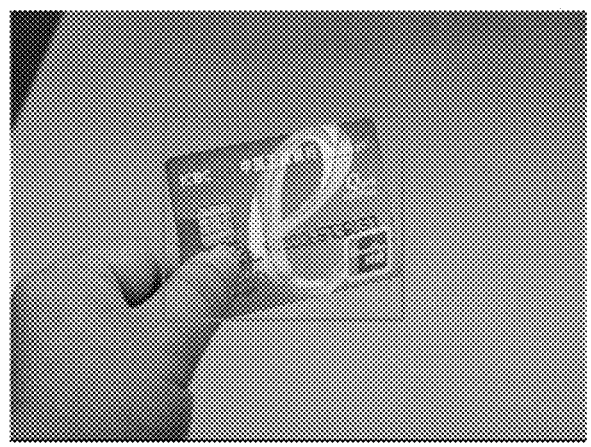
FIG. 3 is an example environment image.

FIG. 3 shows an example environment image. The environment image shown in FIG. 3 may be detected by use of the method for detecting the payment card confidence level of the existence of the payment card in the environment image according to the embodiment of the present application, and the position of the payment card (shown by the box in the figure) and the payment card confidence level (for example, 0.9) may be obtained.

When the payment environment confidence level includes the finger confidence level, the specific method for determining the finger confidence level of the mobile acquiring device according to the environment image may include: extracting feature maps of the environment image to obtain the feature maps of multiple scales; and identifying the finger confidence level of existence of the finger in the environment image, based on the feature maps of multiple scales.

Specifically, a finger detection model may be obtained based on deep learning, and the finger detection model may be used to detect the finger confidence level. The training method for training the finger detection model and the structure of the finger detection model are the same as the payment card detection model described above, and will not be repeated here.

When the payment environment confidence level includes the confidence level of the acquiring device being wrapped by the outer object, the specific method for determining the payment environment confidence level of the mobile acquiring device according to the environment image may include: extracting gray-scale features of the environment image; calculating an image information entropy of the environment image according to the gray-scale features; and determining the confidence level of the mobile acquiring device being wrapped by a wrapping object according to the image information entropy.

When the mobile acquiring device is wrapped by the wrapping object, the environment images collected by an image collection device of the mobile acquiring device are mostly dark backgrounds, which makes the image information entropy lower. Therefore, it is possible to characterize the confidence level of the acquiring device being wrapped by the outer object from an overall "chaos" level of the environment image. The larger the image information entropy is, the lower the possibility that the mobile acquiring device may be wrapped by the wrapping object is.

Suppose the size of the environment image is m×n, the gray-scale level is L, and the gray-scale features {h(s, t), s, t=0, 1, . . . , L−1} of the environment image may be extracted, where h(s,t) is the number of points each of which has a gray scale s and a neighborhood with a mean gray scale t. Then the probability $p_{ij}$ of the feature combination (i, j) is:

$$p_{ij} = \frac{h(i, j)}{m \times n}$$

Here, $\Sigma_{i=0}^{L-1}\Sigma_{j=0}^{L-1}p_{ij}=1$, i and j represent loop variables of the parameters s and t respectively, $0<=i, j<=L-1$.

Next, the image information entropy of the environment image is calculated. For a two-dimensional discrete image, a calculation formula of the image information entropy H is:

$$H = -\Sigma_{i=0}^{L-1}\Sigma_{j=0}^{L-1}p_{ij} \times \log(p_{ij})$$

Thus the confidence level $C_I$ of the acquiring device being wrapped by the outer object is:

$$C_1 = \frac{1}{H}$$

In some embodiments of the present application, when the payment environment confidence level includes one of the payment card confidence level, the finger confidence level, and the confidence level of the acquiring device being wrapped by the outer object, the one confidence level may be directly used as the payment environment confidence level.

In some other embodiments of the present application, when the payment environment confidence level includes two of the payment card confidence level, the finger confidence level, and the confidence level of the acquiring device being wrapped by the outer object, a weighted sum of the two confidence levels may be calculated according to weight values respectively corresponding to the two confidence levels and used as the payment environment confidence level.

In still other embodiments of the present application, when the payment environment confidence level includes the payment card confidence level, the finger confidence level, and the confidence level of the acquiring device being wrapped by the outer object, the specific method for determining the payment information processing result according to the payment environment confidence level may include: calculating the confidence level of the payment card being held by a hand according to the payment card confidence level and the finger confidence level; determining the payment information processing result according to the confidence level of the payment card being held by the hand and the confidence level of the acquiring device being wrapped by the outer object.

Specifically, a weighted sum of the payment card confidence level and the finger confidence level may be calculated according to weight values corresponding to the payment card confidence level and the finger confidence level to obtain the confidence level of the payment card being held by the hand, then a weighted sum of the confidence level of the payment card being held by the hand and the confidence level of the acquiring device being wrapped by the outer object may be calculated according to weight values of the confidence level of the payment card being held by the hand and the confidence level of the acquiring device being wrapped by the outer object to obtain the payment environment confidence level, and the payment information processing result may be determined according to the payment environment confidence level.

A calculation formula of the confidence level $C_2$ of the payment card being held by the hand may be:

$$C_2 = C_{card} \times \frac{(2 + C_{finger})}{3} = C_{card} \times \frac{2}{3} + C_{card} \times C_{finger} \times \frac{1}{3}$$

Here, $C_{card}$ represents the payment card confidence level, and $C_{finger}$ represents the finger confidence level.

That is, ⅔ of score values of the confidence level $C_2$ of the payment card being held by the hand are determined by the detection result of the payment card, and the remaining ⅓ of the score values are determined by a product of the detection results of the payment card and the finger. This is because there is a causal dependence between the two targets: the payment card and the finger. When the finger appears in the environment without the payment card, the risk is still high.

A calculation formula of the payment environment confidence level $C_{safe}$ may be:

$C_{safe} = (1-C_1) \times 0.5 + C_2 \times 0.5$

In some embodiments of the present application, there may be multiple environment images. In this case, the specific method for determining the payment environment confidence level of the mobile acquiring device according to the environment images may further include:

selecting, from the multiple environmental images, a plurality of environmental images each of which is collected at a moment within a predetermined time period;

determining a plurality of target images according to definitions of the plurality of selected environment images;

determining the payment environment confidence level of the mobile acquiring device according to the plurality of target images.

Since there may be multiple environment images during the collection process, some of the environment images may be blurry when the mobile acquiring device has a fast card swiping speed. In order to ensure a recognition rate of detection and reduce the amount of image processing, firstly, the plurality of environment images each of which is collected at a moment within the predetermined time period are selected. For example, the images within 2-3 s before the time the payment card information is obtained are selected. Then, a definition evaluation function may be used to evaluate definitions of the environment images so as to select the target images. For example, the environment images may be sorted in order according to the definitions, and n target images with the largest definitions may be selected. For another example, n target images whose definitions reach a preset definition threshold may be selected. Finally, the payment environment confidence level may be detected with respect to the individual target images in turn.

In the embodiment of the present application, the specific method for determining the payment environment confidence level of the mobile acquiring device according to the plurality of target images may include: determining payment environment confidence levels of the plurality of target images; selecting a highest payment environment confidence level of the payment environment confidence levels as the payment environment confidence level of the mobile acquiring device. Thus, a more accurate detection result of the payment environment confidence level can be obtained.

In the embodiment of the present application, since multiple environment images are used to determine the payment environment confidence level of the mobile acquiring device, it is possible to avoid a problem that fast-moving objects (bank cards, fingers, etc.) have motion blur and are difficult to detect in the environment images. It is also possible to avoid a problem that the detection time is too long and affects the user experience.

In the embodiment of the present application, the specific method for determining the payment information processing result according to the payment environment confidence level may include: determining whether the transaction environment of the mobile acquiring device is a normal transaction environment or an abnormal transaction environment based on the payment environment confidence level and a preset confidence threshold.

For example, when the payment environment confidence level is greater than or equal to the preset confidence threshold, it may be determined that the transaction environment is a normal transaction environment and the payment information processing result is that the transaction is risk-free; when the payment environment confidence level is less than the preset confidence threshold, it may be determined that the transaction environment is an abnormal transaction environment and the payment information processing result is that the transaction is risky.

In the embodiment of the present application, the specific method for determining the payment information processing result according to the payment environment confidence level may additionally or alternatively include: taking a reciprocal of the payment environment confidence level as a transaction risk value, and determining whether the transaction environment of the mobile acquiring device is a normal transaction environment or an abnormal transaction environment based on the transaction risk value and a preset risk value threshold.

In the embodiment of the present application, the specific method for determining the payment information processing result according to the payment environment confidence level may additionally or alternatively include: obtaining transaction-related information and determining a transaction detection result corresponding to the transaction-related information; analyzing the payment environment confidence level and the transaction detection result, and determining a transaction risk level according to a corresponding relationship between the analysis result and the transaction risk level, as the payment information processing result.

The transaction-related information may include a transaction action detection result, merchant information, and transaction location information.

According to the transaction-related information, the payment information processing result corresponding to each transaction-related information may be determined respectively, and then the payment information processing result corresponding to each transaction-related information and the payment environment confidence level may be weighted and summed to obtain the analysis result. According to a numerical range in which the analysis result is located, the transaction risk level may be determined and taken as the payment information processing result.

In the embodiment of the present application, the corresponding relationship between the analysis result and the transaction risk level may be determined depending on a merchant type corresponding to the mobile acquiring device and/or a business scenario corresponding to the acquiring request. That is, numerical ranges corresponding to different transaction risk levels can be determined according to the merchant type corresponding to the mobile acquiring device and/or the business scenario corresponding to the acquiring request. In this case, when the analysis result falls within any numerical range, the payment information processing result can be determined to be the transaction risk level corresponding to the numerical range.

Figure 4:
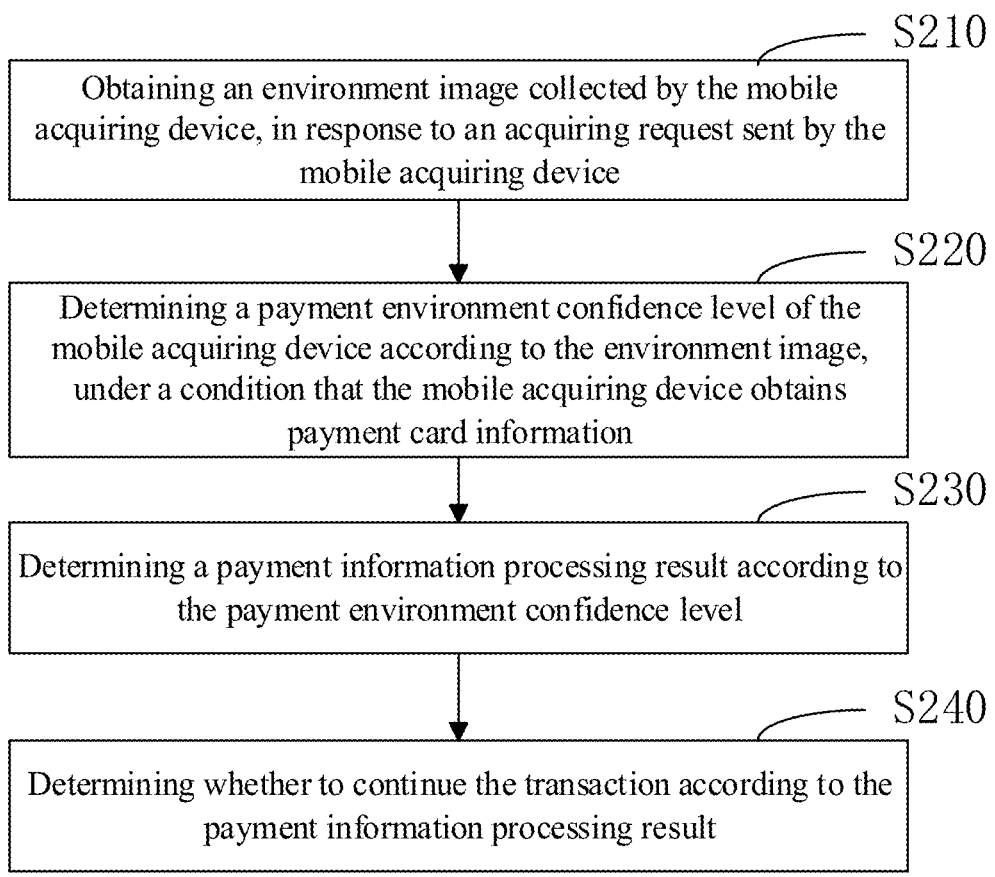
FIG. 4 is a schematic flowchart of a payment information processing method provided by another embodiment of the present application.

FIG. 4 shows a schematic flowchart of a payment information processing method provided by another embodiment of the present application. As shown in FIG. 4, the payment information processing method further includes:

S240: determining whether to continue the transaction according to the payment information processing result.

In the embodiment of the present application, depending on the two kinds of payment information processing results as described above, there may be two options for the method of determining whether to continue the transaction.

The First Option:

In this option, the payment information processing result is that the transaction is risk-free or the transaction is risky. In this case, whether to continue or terminate the transaction can be directly determined according to the payment information processing result. That is, when it is determined that the payment information processing result is that the transaction is risk-free, the transaction is continued; when it is determined that the payment information processing result is that the transaction is risky, the transaction is terminated.

The Second Option:

In this option, the payment information processing result is the transaction risk level. In this case, it is possible to determine whether to continue the transaction according to different transaction risk levels. When the transaction risk level is low, the transaction is continued; when the transaction risk level is high, the cardholder may be notified to make a second confirmation and/or the acquirer may be notified to further verify the merchant's identity.

In an example in which three transaction risk levels are defined:
- when the transaction risk level is level 1, the risk is a minimal risk at this time, the transaction may be completed directly, and the cardholder and the merchant may be notified of the transaction information.
- when the transaction risk level is level 2, the risk is a medium risk at this time, there is a possibility of fraudulent use, and further confirmation by the cardholder is required to further complete the transaction.
- when the transaction risk level is level 3, the risk is a high risk at this time, the possibility of fraudulent use is very high, and the transaction cannot be completed until the cardholder makes further confirmation and the acquirer further verifies the identity of the merchant.

Figure 5:
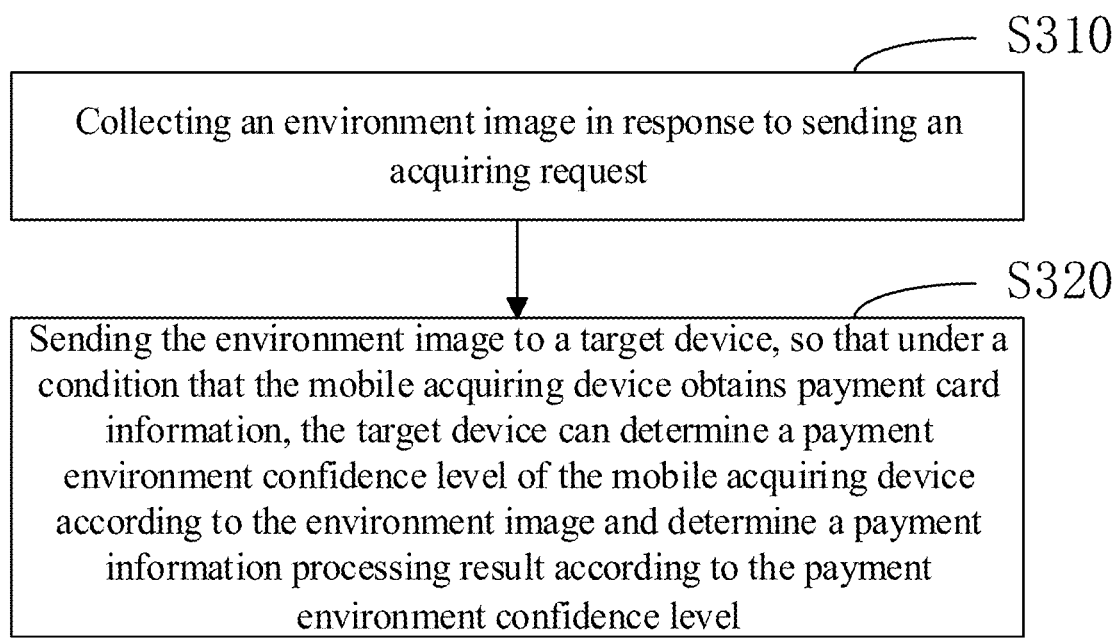
FIG. 5 is a schematic flowchart of a payment information processing method provided by a further embodiment of the present application.

FIG. 5 shows a schematic flowchart of a payment information processing method provided by a further embodiment of the present application. As shown in FIG. 5, the payment information processing method may be applied to the mobile acquiring device 101 shown in FIG. 1 and may include:

S310: collecting an environment image in response to sending an acquiring request;

S320: sending the environment image to a target device, so that under a condition that the mobile acquiring device obtains payment card information, the target device can determine a payment environment confidence level of the mobile acquiring device according to the environment image and determine a payment information processing result according to the payment environment confidence level.

In the embodiment of the present application, the mobile acquiring device can collect the environment image in response to sending the acquiring request and send the environment image to the target device, so that the target device can obtain the environment image collected by the mobile acquiring device after the mobile acquiring device sends the acquiring request, determine the payment environment confidence level of the mobile acquiring device according to the environment image under a condition that the mobile acquiring device obtains the payment card information of the payment card, and determine the payment information processing result related to transaction risk based on the payment environment confidence level so as to provide a risk judgment basis for a transaction. Thus when the merchant uses the mobile acquiring device to initiate a transaction and obtain a transaction object, security of a payment card account of a cardholder corresponding to the transaction object can be improved, and a probability of false or fraudulent use of the payment card can be reduced.

In the embodiment of the present application, the target device may be the device server 102 shown in FIG. 1.

The payment information processing method of the embodiment of the present application may be applied to various transaction cards with a contactless chip or a contact chip, such as a bank card, a bus card or a shopping card, etc.; and may also be applied to a third party payment software in a mobile terminal.

In some embodiments of the present application, the payment card information is information stored in the contact chip or the contactless chip of the payment card. In some other embodiments of the present application, the payment card information may also be information stored in the mobile terminal.

The payment card information may include at least identity information of the cardholder of the payment card and account information of the payment card. The payment card information may be used by a card issuing bank to verify the identity of the cardholder and the transaction account for the transaction.

In the embodiment of the present application, when the merchant uses the mobile acquiring device to have a transaction with the cardholder, the merchant may firstly need to use the mobile acquiring device to send the acquiring request; after sending the acquiring request, the mobile acquiring device may send the acquiring request and/or an acquiring request signal to the device server; and the device server may respond to the acquiring request sent by the mobile acquiring device by responding to the acquiring request and/or the acquiring request signal, and obtain the environment image collected by the mobile acquiring device.

In the embodiment of the present application, the mobile acquiring device may continuously send environment images to the device server in real time after sending the acquiring request, or the mobile acquiring device may send all the collected environment images to the device server once or multiple times when the payment card information is obtained.

In some embodiments of the present application, the payment information processing method may further include: in response to obtaining the payment card information, the mobile acquiring device sends the payment card information and/or a payment card reading signal to the target device, so that in response to the payment card information and/or the payment card reading signal, the target device can determine the payment environment confidence level of the mobile acquiring device according to the environment image under a condition that the mobile acquiring device obtains the payment card information, and determine the payment information processing result based on the payment environment confidence level.

When the mobile acquiring device sends the payment card reading signal to the target device in response to obtaining the payment card information, if the device server determines to continue the transaction based on the payment information processing result, the device server needs to firstly obtain the payment card information from the mobile acquiring device and then proceed to the subsequent transaction process. When the mobile acquiring device sends the payment card information or sends the payment card information and the payment card reading signal to the target device in response to obtaining the payment card information, if the device server determines to continue the transaction based on the payment information processing result, the device server may directly use the payment card information to proceed to the subsequent transaction process.

In some embodiments of the present application, the payment information processing method may further include: the mobile acquiring device stops collecting the environment image in response to obtaining the payment card information. That is, the payment card being actually swiped can be taken as an ending sign, so as to prevent the merchant who fraudulently uses the payment card from performing an "action demonstration" before the payment card is actually swiped to circumvent transaction detection based on environment image detection.

In some embodiments of the present application, the payment information processing method may further include: under a condition that the payment card information has not been obtained and a predetermined time period is reached after the sending of the acquiring request, resending an acquiring request.

Therefore, in the embodiment of the present application, the waiting time for the mobile acquiring device to obtain the payment card information in response to sending the acquiring request may be limited, so that under a condition that the waiting time for the mobile acquiring device to obtain the payment card information reaches the predetermined time period and the mobile acquiring device has not yet obtained the payment card information, the mobile acquiring device may terminate the transaction and need to resend the acquiring request to continue the transaction.

In the embodiment of the present application, the predetermined time period may be set to be any time period in a range of 5 s to 8 s, such as 5 s, 6 s, or 8 s, and may also be set to be other time periods as required.

Since the predetermined time period corresponding to the waiting time for the mobile acquiring device to obtain the payment card information is set in the embodiment of the present application, a possibility that a merchant fraudulently using the payment card continuously uses the mobile acquiring device to fraudulently use the payment card can be reduced in the embodiment of the present application.

Figure 6:
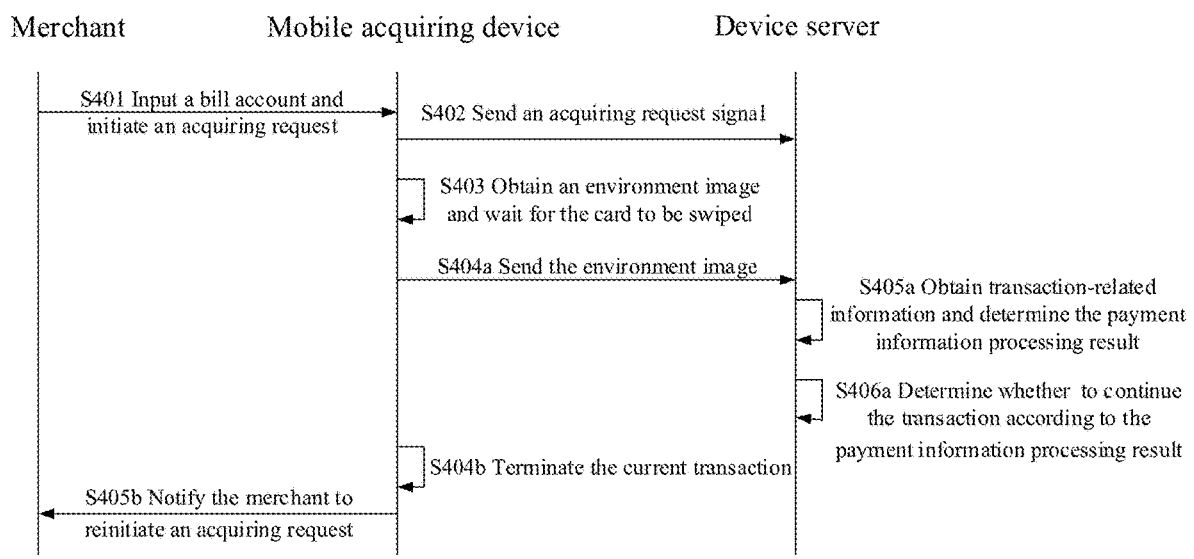
FIG. 6 is a schematic diagram of a transaction process provided by an embodiment of the present application.

FIG. 6 shows a schematic diagram of a transaction process provided by an embodiment of the present application. As shown in FIG. 6, when a merchant uses a mobile acquiring device to conduct a transaction to a payment card, the transaction process between the mobile acquiring device and the device server may include:

S401: after the merchant uses the mobile acquiring device to perform identity authentication and login, the merchant inputs a bill amount to the mobile acquiring device and initiates an acquiring request;

S402: the mobile acquiring device sends an acquiring request signal to the device server;

S403: the mobile acquiring device obtains an environment image collected by the mobile acquiring device and waits for the card to be swiped within a preset time period;

S404*a*: if the mobile acquiring device obtains payment card information of the payment card within the preset time period, the mobile acquiring device sends the environment image to the device server;

S405*a*: the device server obtains transaction-related information, and determines a risk level according to the environmental image and the transaction-related information, as a payment information processing result;

S406*a*: the device server determines whether to continue the transaction according to the payment information processing result;

S404*b*: if the mobile acquiring device fails to obtain the payment card information of the payment card within the preset time period, the mobile acquiring device terminates the current transaction;

S405*b*: the mobile acquiring device notifies the merchant to reinitiate an acquiring request.

In summary, according to the embodiment of the present application, the transaction risk can be evaluated based on the environment image so as to complete analysis and detection of the transaction risk without affecting experience of the merchant and the cardholder, thereby greatly increasing the technical threshold of fraudulent use and effectively reducing occurrence of fraudulent use. In addition, according to the embodiment of the present application, a time correlation among an acquiring initiation event, a payment card environment monitor event, and a payment card information reading event can be established, which can avoid bypassing the risk monitoring function and prevent the merchant from seizing an opportunity to fraudulently use the payment card while the mobile acquiring device continuously obtains the payment card information.

Figure 7:
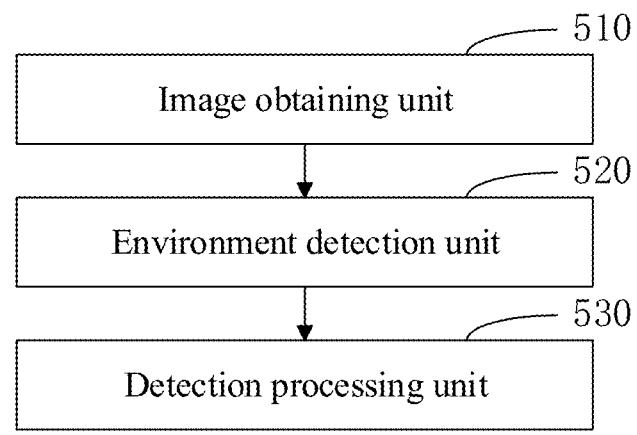
FIG. 7 is a schematic structural diagram of a payment information processing apparatus provided by an embodiment of the present application.

FIG. 7 is a schematic structural diagram of a payment information processing apparatus provided by an embodiment of the present application. As shown in FIG. 7, the payment information processing apparatus may be applied to the device server 102 shown in FIG. 1 and may include:

an image obtaining unit 510 configured to obtain an environment image collected by a mobile acquiring device, in response to an acquiring request sent by the mobile acquiring device;

an environment detection unit 520 configured to determine a payment environment confidence level of the mobile acquiring device according to the environment image, under a condition that the mobile acquiring device obtains payment card information;

a detection processing unit 530 configured to determine a payment information processing result according to the payment environment confidence level.

In the embodiment of the present application, the payment information processing apparatus is able to obtain the environment image collected by the mobile acquiring device after the mobile acquiring device sends the acquiring request, determine the payment environment confidence level of the mobile acquiring device by use of the environment image under a condition that the mobile acquiring device obtains the payment card information of the payment card, and determine the payment information processing result related to the transaction risk based on the payment environment confidence level so as to provide a risk judgment basis for the transaction. Thus when the merchant uses the mobile acquiring device to initiate a transaction and obtain a transaction object, security of a payment card account of a cardholder corresponding to the transaction object can be improved, and a probability of false or fraudulent use of the payment card can be reduced.

The payment information processing apparatus of the embodiment of the present application may be applied to various transaction cards with a contactless chip or a contact chip, such as a bank card, a bus card or a shopping card, etc.; and may also be applied to a third party payment software in a mobile terminal.

In the embodiment of the present application, when the merchant uses the mobile acquiring device to have a transaction with the cardholder, the merchant may firstly need to use the mobile acquiring device to send the acquiring request; after sending the acquiring request, the mobile acquiring device may send the acquiring request and/or an acquiring request signal to the device server; and the device server may respond to the acquiring request sent by the mobile acquiring device by responding to the acquiring request and/or the acquiring request signal, and obtain the environment image collected by the mobile acquiring device.

In the embodiment of the present application, the obtained environment image may be an image collected by the mobile acquiring device between a first moment and a second moment, where the first moment is a moment when the mobile acquiring device sends the acquiring request and the second moment is a moment when the mobile acquiring device obtains the payment card information. In these embodiments, it is not only possible to prevent circumvention of the transaction detection based on the environment image detection, but also possible to reduce an amount of image processing, improve efficiency of the image processing and reduce resource occupation of the device server since the image is collected only from the moment when the acquiring request is sent to the moment when the payment card information is obtained, i.e. during a period when the payment card is actually swiped.

In other embodiments of the present application, the obtained environment image may also be an image collected by the mobile acquiring device between the first moment and a third moment, where the third moment is a moment when the second moment is delayed to reach a delay period.

In the embodiment of the present application, a specific moment for the image obtaining unit 510 to obtain the environment image collected by the mobile acquiring device in response to the acquiring request sent by the mobile acquiring device may be a moment of receiving the acquiring request sent by the mobile acquiring device, that is, after receiving the acquiring request sent by the mobile acquiring device, environment images collected by the mobile acquiring device may be continuously obtained; the specific moment of obtaining the environment image collected by the mobile acquiring device may be a moment when the mobile acquiring device obtains the payment card information, that is, after the mobile acquiring device obtains the payment card information, all the environment images collected by the mobile acquiring device before obtaining the payment card information may be received.

In some embodiments of the present application, the payment card information may be information stored in the contact chip or the contactless chip of the payment card. In some other embodiments of the present application, the payment card information may also be information stored in the mobile terminal.

The payment card information may include at least identity information of the cardholder of the payment card and account information of the payment card. The payment card information may be used by a card issuing bank to verify the identity of the cardholder and the transaction account for the transaction.

In the embodiment of the present application, the waiting time for the mobile acquiring device to obtain payment card information in response to the acquiring request may also be limited. Specifically, the payment information processing apparatus may further include a first timing unit configured to reobtain the environment image collected by the mobile acquiring device in response to an acquiring request resent by the mobile acquiring device, under a condition that the response to the acquiring request reaches a predetermined time period and the mobile acquiring device has not obtained the payment card information. That is, under a condition that the waiting time for the mobile acquiring device to obtain the payment card information reaches the predetermined time period and the mobile acquiring device has not yet obtained the payment card information, the transaction may be terminated, and thus the mobile acquiring device may need to resend the acquiring request. In this case, the device server may reobtain the environment image collected by the mobile acquiring device in response to the acquiring request resent by the mobile acquiring device.

In the embodiment of the present application, the predetermined time period may be set to be any time period in a range of 5 s to 8 s, such as 5 s, 6 s, or 8 s, and may also be set to be other time periods as required.

Since the predetermined time period corresponding to the waiting time for the mobile acquiring device to obtain the payment card information is set in the embodiment of the application, a possibility that a merchant fraudulently using the payment card continuously uses the mobile acquiring device to fraudulently use the payment card can be reduced in the embodiment of the application.

In the embodiment of the present application, the payment environment confidence level may include at least one of a payment card confidence level, a finger confidence level, and a confidence level of the acquiring device being wrapped by an outer object.

When the payment environment confidence level includes the payment card confidence level, the environment detection unit 520 may be further configured to: extract feature maps of the environment image to obtain the feature maps of multiple scales; and identify the payment card confidence level of existence of the payment card in the environment image, based on the feature maps of multiple scales.

When the payment environment confidence level includes the finger confidence level, the environment detection unit 520 may be further configured to: extract feature maps of the environment image to obtain the feature maps of multiple scales; and identify the payment card confidence level of existence of the finger in the environment image, based on the feature maps of multiple scales.

When the payment environment confidence level includes the confidence level of the acquiring device being wrapped by the outer object, the environment detection unit 520 may be further configured to: extract gray-scale features of the environment image; calculate an image information entropy of the environment image according to the gray-scale features; and determine the confidence level of the mobile acquiring device being wrapped by a wrapping object according to the image information entropy.

In some embodiments of the present application, when the payment environment confidence level includes the payment card confidence level, the finger confidence level, and the confidence level of the acquiring device being wrapped by the outer object, the detection processing unit 530 may be further configured to: calculate the confidence level of the payment card being held by a hand according to the payment card confidence level and the finger confidence level; determine the payment information processing result according to the confidence level of the payment card being held by the hand and the confidence level of the acquiring device being wrapped by the outer object.

In the embodiment of the present application, there may be multiple environment images. In this case, the environment detection unit 520 may be further configured to: select a plurality of environmental images each of which is collected at a moment within a predetermined time period from the multiple environmental images; determine a plurality of target images according to definitions of the plurality of selected environment images; determine the payment environment confidence level of the mobile acquiring device according to the plurality of target images.

Specifically, the environment detection unit 520 may be further configured to: determine payment environment confidence levels of the plurality of target images; select a highest payment environment confidence level of the payment environment confidence levels as the payment environment confidence level of the mobile acquiring device.

In the embodiment of the present application, the detection processing unit 530 may be further configured to: obtain transaction-related information and determine the transaction detection result corresponding to the transaction-related information; analyze the payment environment confidence level and the transaction detection result, and determine a transaction risk level according to a corresponding relationship between the analysis result and the transaction risk level, as the payment information processing result.

The corresponding relationship between the analysis result and the transaction risk level may be determined depending on a merchant type corresponding to the mobile acquiring device and/or a business scenario corresponding to the acquiring request. That is, numerical ranges corresponding to different transaction risk levels can be determined according to the merchant type corresponding to the mobile acquiring device and/or the business scenario corresponding to the acquiring request. In this case, when the analysis result falls within any numerical range, the payment information processing result can be determined to be the transaction risk level corresponding to the numerical range.

In the embodiment of the present application, the payment information processing apparatus may further include a transaction determination unit configured to determine whether to continue the transaction according to the payment information processing result.

Figure 8:
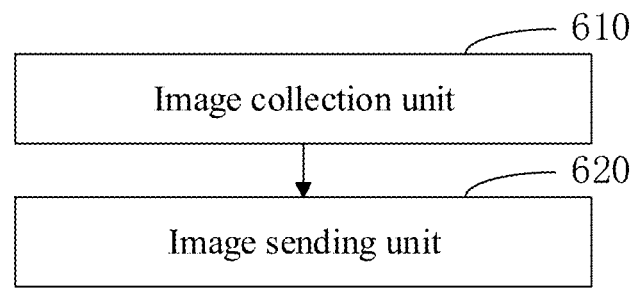
FIG. 8 is a schematic structural diagram of a payment information processing apparatus provided by another embodiment of the present application.

FIG. 8 is a schematic structural diagram of a payment information processing apparatus provided by an embodiment of the present application. As shown in FIG. 8, the payment information processing apparatus may be applied to the mobile acquiring device 101 shown in FIG. 1 and may include:

an image collection unit 610 configured to collect an environment image in response to sending an acquiring request;

an image sending unit 620 configured to send the environment image to a target device, so that under a condition that the mobile acquiring device obtains payment card information, the target device can determine a payment environment confidence level of the mobile acquiring device according to the environment image and determine a payment information processing result according to the payment environment confidence level.

In the embodiment of the present application, the mobile acquiring device can collect the environment image in response to sending the acquiring request and send the environment image to the target device, so that the target device can obtain the environment image collected by the mobile acquiring device after the mobile acquiring device sends the acquiring request, determine the payment environment confidence level of the mobile acquiring device according to the environment image under a condition that the mobile acquiring device obtains payment card information of the payment card, and determine the payment information processing result related to transaction risk based on the payment environment confidence level so as to provide a risk judgment basis for a transaction. Thus when the merchant uses the mobile acquiring device to initiate a transaction and obtain a transaction object, security of a payment card account of a cardholder corresponding to the transaction object can be improved, and a probability of false or fraudulent use of the payment card can be reduced.

In the embodiment of the application, the target device may be the device server 102 shown in FIG. 1.

The payment information processing apparatus of the embodiment of this application may be applied to various transaction cards with a contactless chip or a contact chip, such as a bank card, a bus card or a shopping card, etc.; and may also be applied to a third party payment software in a mobile terminal.

In some embodiments of the present application, the payment card information is information stored in the contact chip or the contactless chip of the payment card. In some other embodiments of the present application, the payment card information may also be information stored in the mobile terminal.

The payment card information may include at least identity information of the cardholder of the payment card and account information of the payment card. The payment card information may be used by a card issuing bank to verify the identity of the cardholder and the transaction account for the transaction.

In the embodiment of the application, the payment information processing apparatus may further include an information sending unit configured to send the acquiring request and/or an acquiring request signal to the device server after the acquiring request is sent, so that the device server can respond to the acquiring request sent by the mobile acquiring device by responding to the acquiring request and/or the acquiring request signal, and obtain the environment image collected by the mobile acquiring device.

In the embodiment of the application, the mobile acquiring device may continuously send environment images to the device server in real time after sending the acquiring request, or the mobile acquiring device may send all the collected environment images to the device server once or multiple times when the payment card information is obtained.

In some embodiments of the present application, the information sending unit may be further configured to: send the payment card information and/or a payment card reading signal to the target device in response to obtaining the payment card information, so that in response to the payment card information and/or the payment card reading signal, the target device can determine the payment environment confidence level according to the environment image under a condition that the mobile acquiring device obtains the payment card information, and determine the payment information processing result based on the payment environment confidence level.

When the mobile acquiring device sends the payment card reading signal to the target device in response to obtaining the payment card information, if the device server determines to continue the transaction based on the payment information processing result, the device server needs to firstly obtain the payment card information from the mobile acquiring device and then proceed to the subsequent transaction process. When the mobile acquiring device sends the payment card information or sends the payment card information and the payment card reading signal to the target device in response to obtaining the payment card information, if the device server determines to continue the transaction based on the payment information processing result, the device server may directly use the payment card information to proceed to the subsequent transaction process.

In the embodiment of the present application, the image collection unit 610 may be further configured to: stop collecting the environment image in response to obtaining the payment card information. That is, the payment card being actually swiped can be taken as an ending sign, so as to prevent the merchant who fraudulently uses the payment card from performing an "action demonstration" before the payment card is actually swiped to circumvent transaction risk evaluation based on environment image detection.

In the embodiment of the present application, the payment information processing apparatus may further include a second timing unit configured to resend, under a condition that the payment card information has not been obtained and a predetermined time period is reached after the sending of the acquiring request, an acquiring request.

Therefore, in the embodiment of the present application, the waiting time for the mobile acquiring device to obtain the payment card information in response to sending the acquiring request may be limited, so that under a condition that the waiting time for the mobile acquiring device to obtain the payment card information reaches the predetermined time period and the mobile acquiring device has not yet obtained the payment card information, the mobile acquiring device may terminate the transaction and need to resend the acquiring request to continue the transaction.

In the embodiment of the present application, the predetermined time period may be set to be any time period in a range of 5 s to 8 s, such as 5 s, 6 s, or 8 s, and may also be set to be other time periods as required.

Since the predetermined time period corresponding to the waiting time for the mobile acquiring device to obtain the payment card information is set in the embodiment of the application, a possibility that a merchant fraudulently using the payment card continuously uses the mobile acquiring device to fraudulently use the payment card can be reduced in the embodiment of the application.

Figure 9:
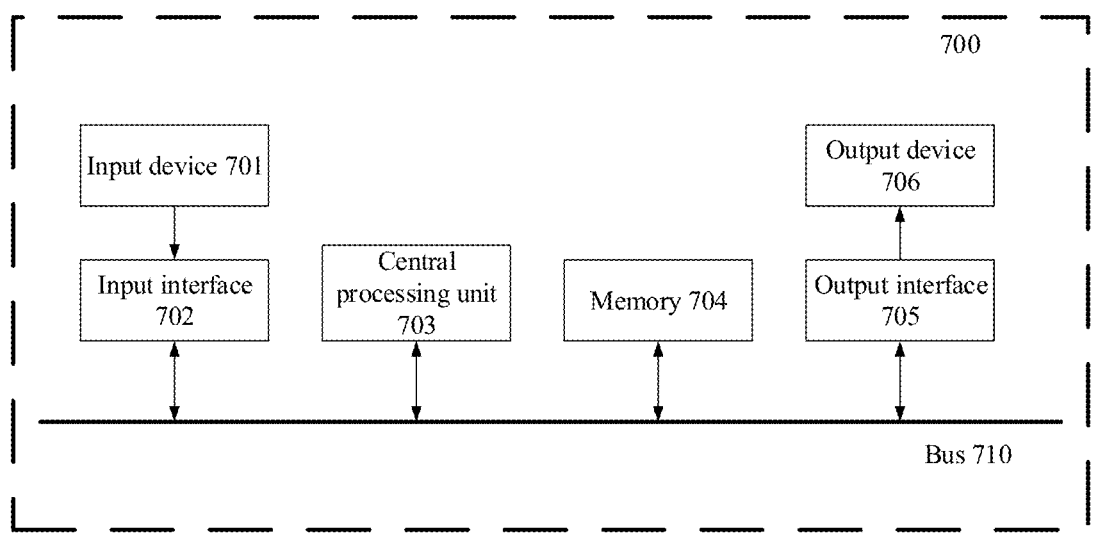
FIG. 9 is a schematic diagram of a hardware structure of a payment information processing device according to an embodiment of the present application.

The payment information processing method and apparatus according to the embodiments of the present application may be implemented by a payment information processing device. FIG. 9 shows a schematic diagram of a hardware structure of a payment information processing device 700 according to an embodiment of the present application.

As shown in FIG. 9, the payment information processing device 700 includes an input device 701, an input interface 702, a central processing unit 703, a memory 704, an output interface 705, and an output device 706. The input interface 702, the central processing unit 703, the memory 704, and the output interface 705 are connected to each other via a bus 710. The input device 701 and the output device 706 are connected to the bus 710 via the input interface 702 and the output interface 705 respectively, and then are connected to other components of the payment information processing device 700.

Specifically, the input device 701 receives input information from outside, and transmits the input information to the central processing unit 703 through the input interface 702; the central processing unit 703 processes the input information based on computer executable instructions stored in the memory 704 to generate output information, temporarily or permanently stores the output information in the memory 704, and then transmits the output information to the output device 706 through the output interface 705; the output device 706 outputs the output information to the outside of the payment information processing device 700 for use by the user.

In other words, the payment information processing device shown in FIG. 9 may also be implemented as including: a memory storing computer executable instructions; and a processor that can implement the payment information processing method and apparatus as described in the embodiments of the present application when executing the computer executable instructions.

The embodiments of the present application also provide a computer-readable storage medium having computer program instructions stored thereon; the computer program instructions, when executed by a processor, can implement the payment information processing method provided in the embodiments of the present application.

The functional blocks shown in the above structural block diagram can be implemented as hardware, software, firmware, or a combination thereof. When implemented in hardware, the functional blocks may be, for example, an electronic circuit, an application specific integrated circuit (ASIC), appropriate firmware, a plug-in, a function card, and so on. When implemented in software, the elements of the present application are programs or code segments used to perform required tasks. The programs or code segments may be stored in a machine-readable medium, or transmitted on a transmission medium or a communication link via a data signal carried in a carrier wave. The "machine-readable medium" may include any medium that can store or transmit information. Examples of the machine-readable medium include an electronic circuit, a semiconductor memory device, a ROM, a flash memory, an erasable ROM (EROM), a floppy disks, a CD-ROM, an optical disk, a hard disk, a fiber optic medium, a radio frequency (RF) link, and so on. The code segments may be downloaded via a computer network such as the Internet, an intranet, etc.

Although the present application has been described with reference to preferred embodiments, various modifications can be made without departing from the scope of the present application and the components therein can be replaced with equivalents. In particular, as long as there is no structural conflict, various technical features mentioned in various embodiments can be combined in any manner. The present application is not limited to the specific embodiments disclosed herein, but includes all technical solutions falling within the scope of the claims.

What is claimed is:

1. A method, comprising:
receiving, by a device server from a mobile acquiring device over a computer communication network, a first acquiring request representing a request to read data from a card using Near Field Communication (NFC) processing;

sending, by the device server to the mobile acquiring device over the computer communication network, first instructions causing the mobile acquiring device to obtain an environment image using a camera of the mobile acquiring device during the NFC processing, wherein the first instructions are sent in response to receipt by the device server of the first acquiring request;

receiving, by the device server from the mobile acquiring device, the environment image collected by the mobile acquiring device;

extracting, by the device server from the environment image, feature maps to obtain feature maps of multiple scales;

processing, by the device server, the feature maps of multiple scales to determine an environment confidence level of the mobile acquiring device according to the environment image, under a condition that the mobile acquiring device performs the NFC processing;

determining, by the device server, a processing result according to the environment confidence level; and determining, by the device server, whether to permit or stop the NFC processing associated with the first acquiring request based on the processing result, wherein the determining the environment confidence level comprises determining a weighted sum of at least two of following confidence levels as the environment confidence level: a card confidence level indicating a confidence that a representation of the card has been detected in the environment image, a finger confidence level indicating a confidence that a representation of a finger has been detected in the environment image, and a confidence level that the mobile acquiring device is wrapped by an outer object, wherein the environment image is an image collected by the mobile acquiring device between a first moment and a second moment, the first moment is a moment when the mobile acquiring device sends the first acquiring request to the device server, and the second moment is a moment when the mobile acquiring device obtains card information for the NFC processing, and wherein the determining, by the device server, a processing result according to the environment confidence level comprises:

obtaining NFC processing-related information and determining a processing detection result corresponding to the NFC processing-related information; and analyzing the environment confidence level and the processing detection result, and determining a risk level according to a corresponding relationship between an analysis result and the risk level, as the processing result.

2. The method of claim 1, wherein the card information is information stored in a chip of an NFC-enabled card or in a mobile terminal.

3. The method of claim 1, wherein the environment confidence level comprises the card confidence level, and the processing, by the device server, the environment image to determine the environment confidence level of the mobile acquiring device according to the environment image comprises:

identifying the card confidence level of existence of the representation of the card in the environment image, based on the feature maps of multiple scales.

4. The method of claim 1, wherein the environment confidence level comprises the finger confidence level, and the processing, by the device server, the environment image to determine the environment confidence level of the mobile acquiring device according to the environment image comprises:

identifying the finger confidence level indicating an existence of the representation of the finger in the environment image, based on the feature maps of multiple scales.

5. The method of claim 1, wherein the environment confidence level comprises the confidence level that the mobile acquiring device is wrapped by the outer object, and the processing, by the device server, the environment image to determine the environment confidence level of the mobile acquiring device according to the environment image comprises:

extracting gray-scale features of the environment image;

calculating an image information entropy of the environment image according to the gray-scale features; and determining the confidence level that the mobile acquiring device is wrapped by the outer object according to the image information entropy.

6. The method of claim 2, wherein the determining, by the device server, the processing result according to the environment confidence level comprises:

calculating a confidence level of the card being held by a hand according to the card confidence level and the finger confidence level; and determining the processing result according to the confidence level of the card being held by the hand and the confidence level that the mobile acquiring device is wrapped by the outer object.

7. The method of claim 1, further comprising:

reobtaining, under a condition that a response to the first acquiring request reaches a predetermined time period and the mobile acquiring device has not obtained the card information, the environment image collected by the mobile acquiring device in response to an acquiring request resent by the mobile acquiring device.

8. The method of claim 1, wherein the environment image comprises multiple environment images, and the processing, by the device server, the environment image to determine the environment confidence level of the mobile acquiring device according to the environment image comprises:

selecting, from the multiple environmental images, a plurality of environment images each of which is collected at a moment within a predetermined time period;

determining a plurality of target images according to definitions of the plurality of selected environment images; and determining the environment confidence level of the mobile acquiring device according to the plurality of target images.

9. The method of claim 8, wherein the determining the environment confidence level of the mobile acquiring device according to the plurality of target images comprises:

determining environment confidence levels of the plurality of target images; and selecting a highest environment confidence level of the environment confidence levels as the environment confidence level of the mobile acquiring device.

10. The method of claim 1, wherein the corresponding relationship between the analysis result and the risk level is determined depending on a type corresponding to the mobile acquiring device.

11. The method of claim 1, further comprising:
    determining whether to continue the NFC processing according to the processing result.

12. A device, comprising a processor and a memory having computer program instructions stored thereon, wherein the computer program instructions, when executed by the processor, cause the processor to:
    receive, by the device from a mobile acquiring device over a computer communication network, a first acquiring request representing a request to read data from a card using a Near Field Communication (NFC) processing;
    send, by the device to the mobile acquiring device over the computer communication network, first instructions causing the mobile acquiring device to obtain an environment image using a camera of the mobile acquiring device during the NFC processing;
    receive, by the device from the mobile acquiring device, the environment image collected by the mobile acquiring device;
    extract, by the device from the environment image, feature maps to obtain feature maps of multiple scales;
    process the feature maps of multiple scales to determine an environment confidence level of the mobile acquiring device according to the environment image, under a condition that the mobile acquiring device performs the NFC processing;
    determine a processing result according to the environment confidence level; and
    determine whether to permit or stop the NFC processing associated with the first acquiring request based on the processing result,
    wherein a weighted sum of at least two of following confidence levels is determined as the environment confidence level: a card confidence level indicating a confidence that a representation of the card has been detected in the environment image, a finger confidence level indicating a confidence that a representation of a finger has been detected in the environment image, and a confidence level that the mobile acquiring device is wrapped by an outer object,
    the environment image is an image collected by the mobile acquiring device between a first moment and a second moment, the first moment is a moment when the mobile acquiring device sends the first acquiring request to the device, and the second moment is a moment when the mobile acquiring device obtains card information for the NFC processing, and
    the computer program instructions, when executed by the processor, cause the processor to determine the processing result according to the environment confidence level by:
    obtaining NFC processing-related information and determining a processing detection result corresponding to the NFC processing-related information; and
    analyzing the environment confidence level and the processing detection result, and determining a risk level according to a corresponding relationship between an analysis result and the risk level, as the processing result.

* * * * *